(12) United States Patent
Zuccaro

(10) Patent No.: US 12,736,194 B2
(45) Date of Patent: Sep. 15, 2026

(54) SURFACE MOUNTED LIGHTING SYSTEM

(71) Applicant: Francesco Zuccaro, Beamsville (CA)

(72) Inventor: Francesco Zuccaro, Beamsville (CA)

( * ) Notice: Subject to any disclaimer, the term of this patent is extended or adjusted under 35 U.S.C. 154(b) by 0 days.

(21) Appl. No.: 19/217,785

(22) Filed: May 23, 2025

(65) Prior Publication Data

US 2026/0055861 A1 Feb. 26, 2026

(30) Foreign Application Priority Data

Aug. 21, 2024 (CA) .................................... 3252798

(51) Int. Cl.

*F21S 8/00* (2006.01)
*F21S 8/04* (2006.01)
*F21V 21/08* (2006.01)
*F21V 23/00* (2015.01)
*H02G 3/00* (2006.01)
*F21Y 101/00* (2016.01)
*F21Y 115/10* (2016.01)

(52) U.S. Cl.

CPC .......... *F21S 8/046* (2013.01); *F21V 21/0808* (2013.01); *F21V 23/001* (2013.01); *F21V 23/008* (2013.01); *H02G 3/266* (2013.01); *F21Y 2101/00* (2013.01); *F21Y 2115/10* (2016.08)

(58) Field of Classification Search

CPC .... F21S 8/046; F21V 21/0808; F21V 23/001; F21V 23/008; H02G 3/266

See application file for complete search history.

(56) References Cited

U.S. PATENT DOCUMENTS

| | | | | |
|---|---|---|---|---|
| 3,382,315 | A | 5/1968 | Minnich | |
| 6,135,615 | A * | 10/2000 | Lee | F21V 21/35 362/147 |
| 10,969,090 | B1 * | 4/2021 | Novakovic | F21V 21/0808 |
| 11,391,452 | B1 * | 7/2022 | Novakovic | F21V 21/0808 |
| 2005/0146899 | A1 | 7/2005 | Joseph et al. | |
| 2012/0002427 | A1 * | 1/2012 | Moon | F21K 9/275 362/382 |

(Continued)

FOREIGN PATENT DOCUMENTS

| | | |
|---|---|---|
| CN | 212204129 U | 12/2020 |
| CN | 216408662 U | 4/2022 |

(Continued)

*Primary Examiner* — Gerald J Sufleta, II

(74) *Attorney, Agent, or Firm* — KARCESKI IP LAW, PLLC

(57) ABSTRACT

A surface mounted lighting system includes a pre-cut aluminum strip conductor adapted for direct attachment to a wall surface or ceiling surface to define a circuit path. At least one LED light is in electrical communication with the pre-cut aluminum strip conductor at a selected surface location on the wall or ceiling surface. An aluminum feed strip and an aluminum return strip provide electrical connection between the pre-cut aluminum strip conductor loop and a controller having electronics or electrical circuitry for controlling operation of the at least one LED light and for providing power for energizing the at least one LED light adhered to the pre-cut aluminum strip conductor. A method of installing a surface mounted lighting system so also provided. The surface mounted lighting system does not require a user to design and lay out an electrical circuit upon which to install LED lights.

7 Claims, 7 Drawing Sheets

(56) References Cited

U.S. PATENT DOCUMENTS

| | | | | |
|---|---|---|---|---|
| 2018/0252393 | A1 * | 9/2018 | Layne ....................... | F21S 8/06 |
| 2023/0160546 | A1 | 5/2023 | Martinez Weber | |

FOREIGN PATENT DOCUMENTS

| | | | |
|---|---|---|---|
| EP | 2383840 | A2 | 11/2011 |
| GB | 1604676 | A | 12/1981 |
| WO | 9963627 | A1 | 12/1999 |
| WO | 2013120892 | A2 | 8/2013 |

* cited by examiner

SURFACE MOUNTED LIGHTING SYSTEM

CROSS-REFERENCE TO RELATED APPLICATION(S)

This US non-provisional patent application relies on and claims priority to Canadian Patent Application No. 3,252,798, filed on Aug. 21, 2024, the entire contents of which are incorporated herein by reference.

FIELD OF THE INVENTION

The disclosure relates generally to surface mounted lighting systems.

BACKGROUND OF THE INVENTION

The installation of most ceiling lighting systems involves drilling into the ceiling and/or walls to mount lighting fixtures and switches and to connect into household electrical wiring. The average homeowner may not have the tools needed to complete a conventional flighting installation. Given the inherent risks in accessing and modifying electrical wiring, lighting installations are best performed by a professional electrician.

Recently ceiling lighting systems have been developed using surface mounted copper foil taping strips to provide electrical connection between a conventional electrical wall outlet and one or more LED puck lights which can be fixed to a ceiling or to walls using adhesive. These lighting systems can be installed manually without the need for drilling into walls or ceiling.

U.S. Pat. No. 10,969,090 (Novakovic) teaches a surface mounted electrical device system having a pair of copper foils/strips ("copper strips") extending along a majority of, if not the entire, length of a removable guide tape. The copper strips are provided with adhesive on their opposite side for securement to the intended surface (e.g. ceiling, wall, etc.) in a room. One or more lights (e.g. 12V LED light) can be adhered to the surface secured copper tape, after the guide tape is removed, to create an electrical connection between the copper tape and light(s). An electrical controller can also be adhered to the copper tape preferably similar to how the lights are secured to the copper tape to create an electrical connection/communication between the electrical controller and the copper tape and for sending power to the light(s) when the electrical controller is turned on or otherwise instructed. Though the electrical controller is preferably electrically connected to an electrical outlet within the room for receiving power, it is also within the scope of the disclosure that the electrical controller can also be powered by batteries (rechargeable and/or non-rechargeable). A remote controller can also be provided to remotely and wirelessly communicate with the electrical controller to operate the lighting system.

There are a number of drawbacks inherent in the prior art surface mounted lighting system taught by U.S. Pat. No. 10,969,090. The system uses copper tape as the conductive material to create electrical connection and communication between the electrical controller and the lights. Materials made of copper or copper alloys are subject to corrosion. When exposed to the atmosphere, copper oxidizes, causing normally bright copper surfaces to tarnish. After a few years, this tarnish gradually changes to dark brown or black, and finally to green. This inevitable corrosion will spoil the visual appearance of exposed copper tape used to connect the lights. Moreover, while it is possible to paint over the copper tape to make the tape less visible against the ceiling and walls, the copper will nevertheless corrode, and the oxidized copper will react with any paint applied over it to cause unsightly staining of the painted surface in areas overlying the copper tape. There is a need for a surface mounted lighting system that will not discolour over time and will not damage the finish of a paint layer applied to cover a circuit constructed from circuit tape.

Copper has a high thermal conductivity and will transfer heat. When copper tape is used for the electrical connections in a surface mounted electrical device system particular care must be taken in reinforce joints and corners formed with copper tape. If the copper electrical connections are not reinforced correctly, the surface mounted lighting system will fail to function efficiently. More specifically, if there are no L-shape reinforcements provided on corners of the copper tape circuit, the lights will flicker or not light up at all, as not enough current will flow through the system. The loss of current flow is attributable to electrons jumping the gap between pieces of copper tape connected to one another at corners or other connection points. Copper tape is only typically rated at 80% continuity. Reinforcement of copper tape connections is required to achieve 100% continuity. There is a need for a simplified surface mounted lighting system that does not require reinforcement of copper strip electrical connections.

The prior art teaches a surface mounted electrical device system with an elaborate array of copper conductive strips and reinforcing strips, some of which may include insulating components to enable a user to plot complex circuits which may include T-intersections, plus (+) shaped intersections and the like. While this prior art system may permit the construction of a variety of circuit shapes which would permit user customization of the lighting locations, it also requires that the user be well versed in DIY projects and have some understanding of electrical circuitry. A user would need to determine whether elements should be connected in series or in parallel, where connections should be positioned, whether insulation is necessary if copper strips need to be intersected or crossed, etc. The installation of the prior art system requires measuring and cutting lengths of copper tape to assemble the system. Particular care must be taken to cut the ends of the copper strips to complementary shapes where the path of the circuit is intended to change direction of form intersections. A guide tool may be required to achieve precision cuts and joints. There is a need for a simplified surface mounted lighting system which does not require a user to design and lay out an electrical circuit upon which to install LED lights. There is a need for a simplified surface mounting system which minimizes the number of electrical connections which must be created to form a functional electric circuit with lights and a controller connected to a power supply.

A surface mounted lighting system which uses copper strips to form the circuit can only be used in dry environments, which limits the utility of the prior art system to indoor lighting systems in dry environments. If copper is used in a wet environment moisture causes the copper to corrode and turn green quickly. There is a need for a surface mounted lighting system which could be used in damp environments such as washrooms and that could be installed in outdoor conditions.

SUMMARY OF THE INVENTION

A surface mounted lighting system is constructed with a pre-cut aluminum strip conductor adapted for direct attachment to a wall surface or a ceiling surface to define a circuit path. The pre-cut aluminum strip conductor comprises a first conductor member, and a second conductor member in spaced apart relation to the first conductor member. At least one LED light having a first electrical contact and a second electrical contact is adhered to and in electrical communication with the pre-cut aluminum strip conductor at a selected surface location on the wall or ceiling surface. A controller having electronics or electrical circuitry for controlling operation of the at least one LED light and for providing power for energizing the at least one LED light adhered to the pre-cut aluminum strip conductor. An aluminum feed strip provides for electrical connection between the pre-cut aluminum strip conductor loop and the controller. An aluminum return strip provides for electrical connection between the pre-cut aluminum strip conductor loop and the controller to complete an electrical circuit.

The first conductor member and the second conductor member each comprise an aluminum strip of a selected size and shape to make electrical contact with a respective one of the first electrical contact and the second electrical contact of the at least one LED light. An adhesive layer is fixed to a first side of each of the first conductor member and the second conductor member for attachment to the wall or ceiling surface. A removable backing layer is provided in protective contact with the adhesive layer prior to attachment to the wall or ceiling surface.

A method of installing a surface mounted lighting system comprises the following steps: providing a pre-cut aluminum strip conductor comprising a first conductor member, and a second conductor member in spaced apart relation to the first conductor member, each of the first conductor member and the second conductor member comprising an aluminum strip of a selected size and shape to make electrical contact with a respective one of a first electrical contact and a second electrical contact of the at least one LED light, an adhesive layer fixed to a first side of each of the first conductor member and the second conductor member for attachment to the wall or ceiling surface, and a removable backing layer in protective contact with the adhesive layer prior to attachment to the wall or ceiling surface. The next step is removing the removable backing layer and attaching the adhesive layer of the first conductor member and the second conductor member to the wall surface or ceiling surface. Then the first electrical contact of the LED light is adhered to the first conductor member and the second conductor member of the electrical contact of the LED light is adhered with the second electrical contact of the LED light in electrical communication. An aluminum feed strip is attached for electrical connection between the pre-cut aluminum strip conductor and a controller having electronics or electrical circuitry for controlling operation of the at least one LED light and for providing power for energizing the at least one LED light adhered to the pre-cut aluminum strip conductor. An aluminum return strip is attached for electrical connection between the pre-cut aluminum strip conductor and the controller to complete an electrical circuit. Finally, the controller is connected to an electrical supply.

DETAILED DESCRIPTION OF EMBODIMENT(S) OF THE INVENTION

Figure 1:
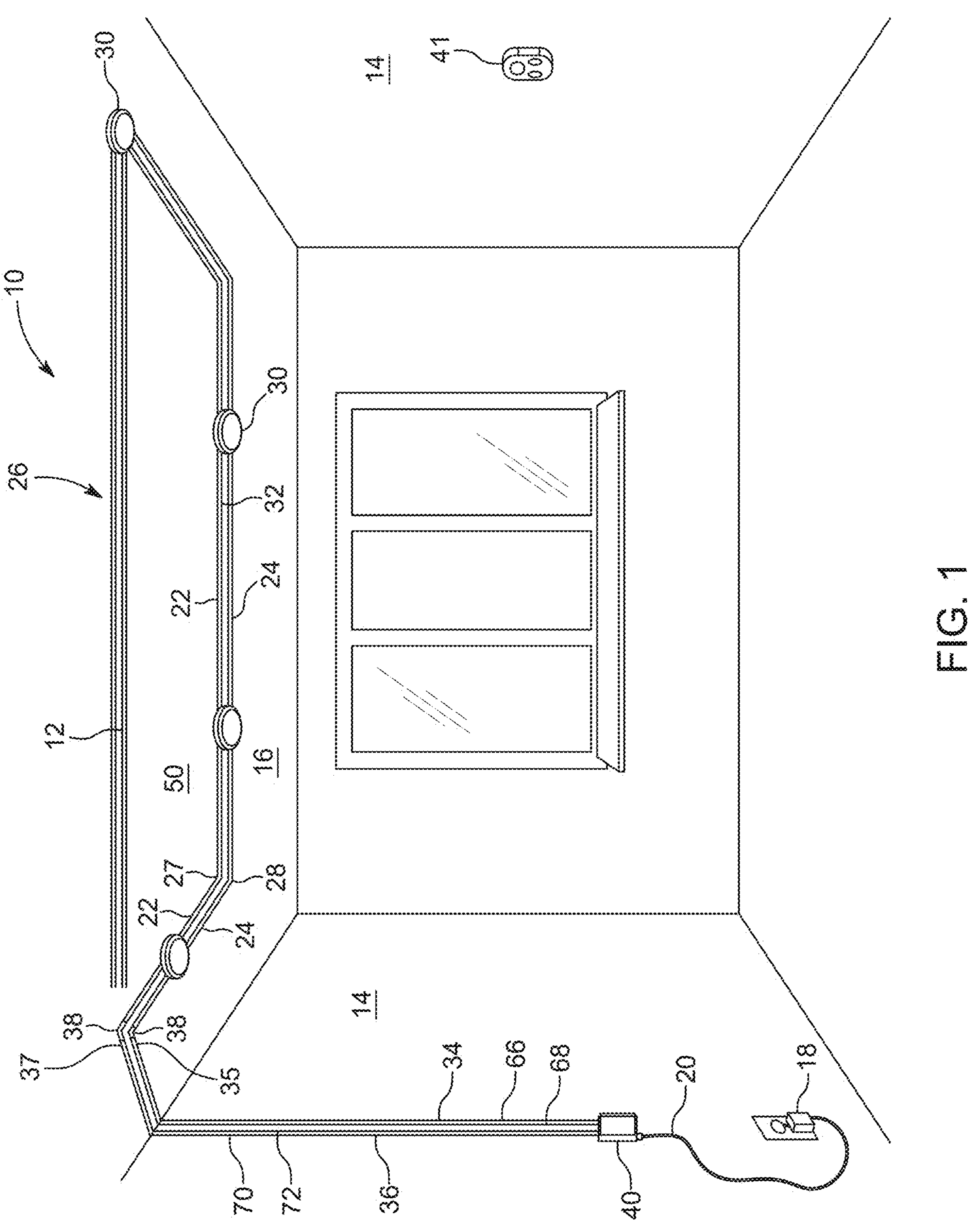
FIG. 1 is a perspective view of one embodiment for the surface mounted lighting system in accordance with the present disclosure.
Figure 2:
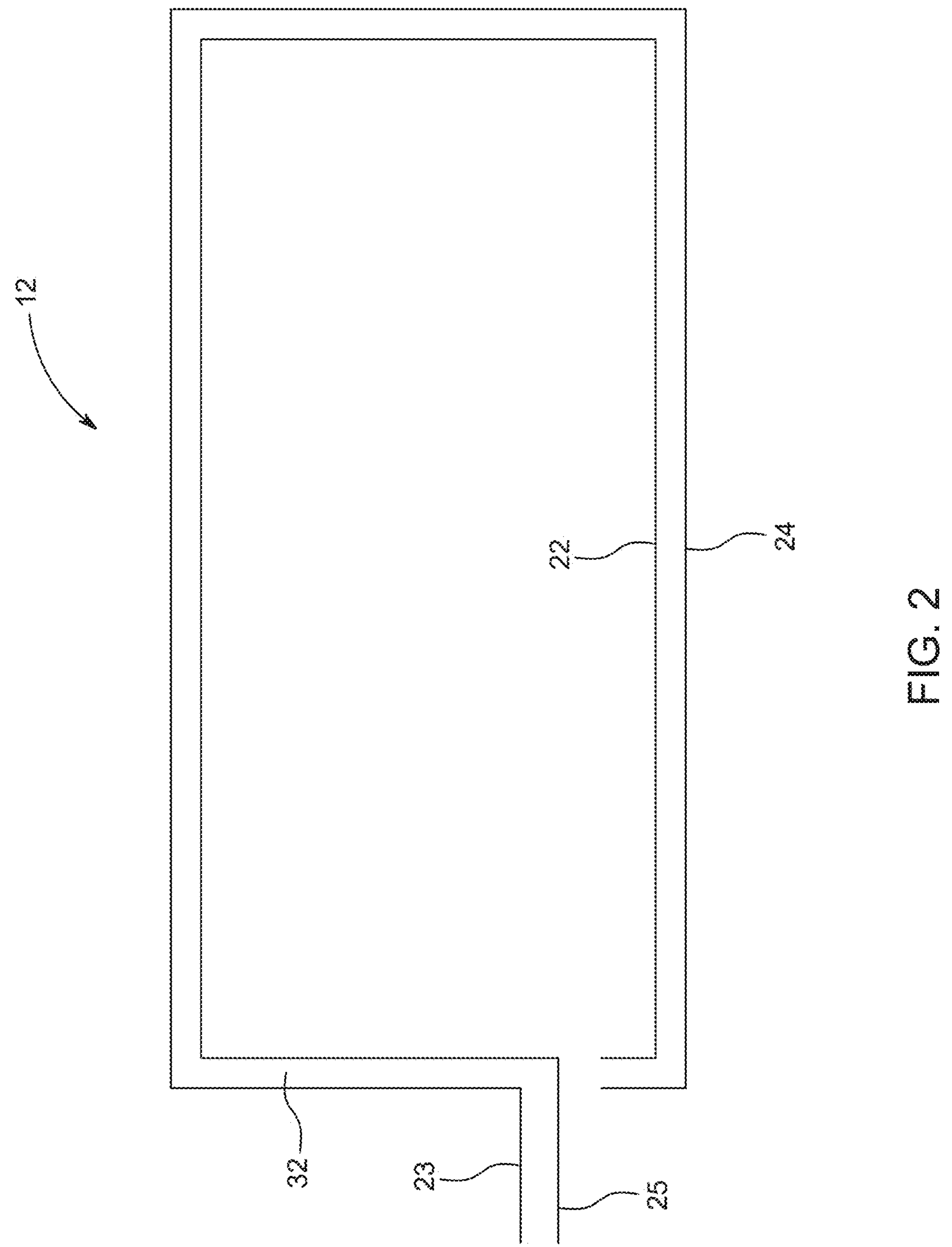
FIG. 2 is a plan view of a pre-cut aluminum strip conductor for a surface mounted lighting system of the present invention.

Certain terminology is used in the following description for convenience only and is not limiting. Unless specifically set forth herein, the terms "a," "an" and "the" are not limited to one element, but instead should be read as meaning "at least one." The terminology includes the words noted above, derivatives thereof and words of similar import.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process, when possible, as well as performed sequentially as described above.

Certain terminology is used in the following description for convenience only and is not limiting. The words "lower," "bottom," "upper," and "top" designate directions in the drawings to which reference is made. The words "inwardly" and "outwardly,", "upwardly" and "downwardly", "axially" and "peripherally" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Where structural elements having the same structural and functional characteristics are used in pairs, they may be designated by using a single reference numeral for the element, with the prime (') symbol designating the two identical structural elements of a pair.

As can be seen in FIG. 1, the present invention is a surface mounted lighting system generally designated by reference numeral 10. The surface mounted lighting system comprises a pre-cut aluminum strip conductor 12 adapted for direct attachment to a wall 14 or a ceiling surface 16. At least one LED light 30 is adhered to and is in electrical communication with the pre-cut aluminum strip conductor 12 at a selected surface location on the wall or ceiling surface. For illustration purposes, FIG. 1 shows the pre-cut aluminum strip conductor 12 at a selected surface identified by underlined numeral 50 on the ceiling 16. Alternatively, if a user prefers the LED lights to be wall-mounted instead of ceiling mounted, the pre-cut aluminum strip conductor could be mounted on the wall surface 14. FIG. 1 shows a plurality of LED lights 30 adhered to the pre-cut aluminum strip conductor 12. In the embodiment illustrated in FIG. 1 the circuit path 26 defined by the pre-cut aluminum strip conductor is substantially rectangular having straight elements and corners. It should be noted that the LED lights can be positioned either along a straight stretch of the pre-cut aluminum strip conductor 12 or at one or more corners on the aluminum strip conductor 12.

Figure 7:
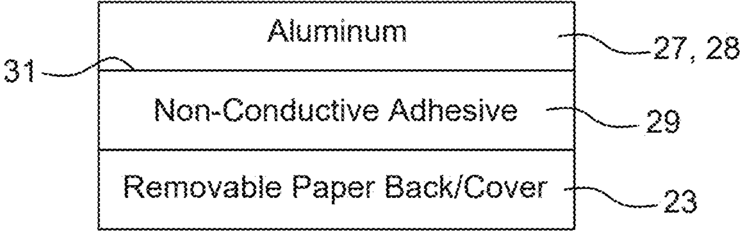
FIG. 7 is a schematic representation of a side view of a portion of the pre-cut aluminum strip circuit showing detail of its layered structure.

The pre-cut aluminum strip conductor 12 comprises a first conductor member 22, and a second conductor member 24 in spaced apart relation to the first conductor member 22 leaving a gap 32 therebetween. The first conductor member 22 and the second conductor member 24 each comprise an aluminum strip element (elements 27 and 28 respectively as seen in FIG. 7) of a selected size and shape to make electrical contact with a respective one of the first electrical contact and the second electrical contact of the at least one LED light. An adhesive layer 29 fixed to a first side 31 of each aluminum strip 27, 28 which form the first conductor member 22 and the second conductor member 24 for attachment to the wall 14 or ceiling surface 16.

In accordance with a preferred but non-limiting embodiment, the pre-cut aluminum strip conductor 12 is constructed from aluminum strip material of approximately 13 mm in width. The thickness of the aluminum strip material is approximately 0.127 mm, which when a backing layer is removed results in an aluminum thickness of approximately 0.0762 mm.

The pre-cut aluminum strip conductor 12 is in the nature of a stencil for a circuit which is cut to shape during manufacturing. Preferably the circuit is of substantially rectangular shape to span an expanse of ceiling (or wall surface). All linear stretches and corners in the substantially rectangular shape of the pre-cut aluminum strip conductor are integrally formed during manufacturing. The structure of the pre-cut aluminum strip conductor 12 eliminates the need to join separate pieces of conductive material to form corners. Without assembled joints at corners, there is no need to reinforce corners to ensure 100% electrical continuity.

Since the aluminum strip conductor 12 is a pre-cut assembly, it defines a circuit path 26 for deploying one or more LED lights 30 within a room. A user is not required to measure and cut a plurality of aluminum strips and then position them on the wall and the ceiling to form a first conductor member and a second conductor member spaced apart from the first, and then join them to form a circuit path. Instead, the pre-cut aluminum strip conductor 12 is constructed with the second conductor member 24 in spaced apart relation to the first conductor member 22 leaving a gap 32 therebetween. The size and shape of each of the first 22 and second 24 conductor members, and their respective orientation is pre-determined to ensure that the first conductor member 22 runs parallel to the second conductor member 24 with the gap 32 between them being of a consistent width. The first conductor member 22 and the second conductor member 24 are pre-manufactured peel and stick stencils. All the user needs to do during installation is to peel and stick the first conductor member 22 in the desired location. Then the user will peel and stick the second conductor member 24 adjacent to the first connection member 22 in parallel and spaced apart relation with gap 32 using a spacer tool (not shown).

At least one LED light 30 is adhered to and is in electrical communication with the pre-cut aluminum strip conductor 12 at a selected surface location 50 on the ceiling surface 16 (or wall 14). If desired, multiple LED lights can be adhered to the pre-cut aluminum strip conductor in spaced apart relation to provide light at desired locations around the ceiling or wall. As will be discussed in greater detail below, the LED light(s) are fixed to the pre-cut aluminum conductor 12 by contact with a conductive adhesive 64.

A controller 40 is provided having electronics or electrical circuitry for controlling operation of the at least one LED light 30 and for providing power for energizing the at least one LED light adhered to the pre-cut aluminum strip conductor 12. The controller 40 may be powered by a conventional AC outlet 18 using a conventional electrical cord 20. Alternatively, the controller could be battery powered with either rechargeable or non-rechargeable batteries.

An aluminum feed strip 34 is in electrical connection 38 between the pre-cut aluminum strip conductor 12 and the controller 40. An aluminum return strip 36 is in electrical connection 38 between the pre-cut aluminum strip conductor 12 and the controller 40 to complete an electrical circuit. Both the aluminum feed strip 34 and the aluminum return strip 36 comprise a pair of conductive aluminum members. The aluminum feed strip 34 is comprised of a first conductive aluminum member 66 and a second conductive aluminum member 68, the ends 35 and 35' of which can be seen in FIG. 3A. The aluminum return strip 36 is comprised of a first conductive aluminum member 70 and a second conductive aluminum member 72.

Figure 3A:
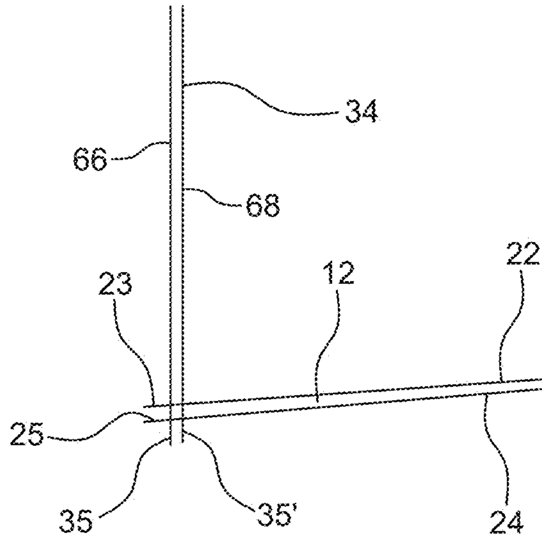
FIG. 3A is an enlarged view of a portion of a pre-cut aluminum strip conductor positioned for attachment to an aluminum feed strip.
Figure 3B:
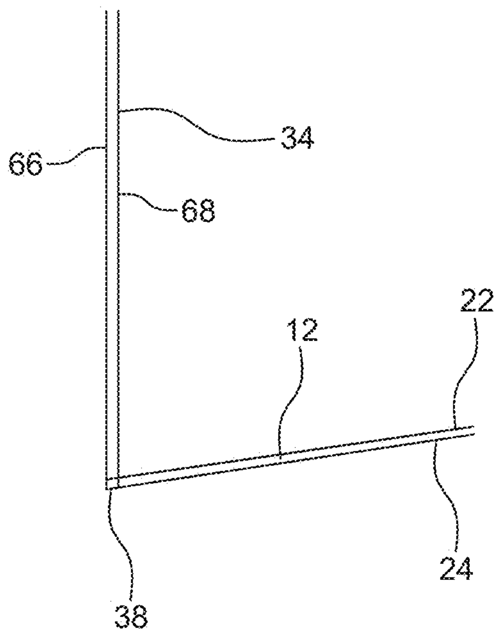
FIG. 3B is an enlarged view of the portion of a pre-cut aluminum strip conductor attached to the aluminum feed strip.

Since the pre-cut aluminum strip conductor 12 defines the linear portions and the corners of the circuit, all that the user needs to do during the installation to complete the electrical circuit is to connect the pre-cut aluminum strip conductor 12 to the aluminum feed strip 34 and the aluminum return strip 36. FIG. 3A and FIG. 3B illustrate the manner in which the electrical connections 38 are made between the pre-cut aluminum strip conductor 12 and both the aluminum feed strip 34 and the aluminum return strip 36. For illustration purposes FIG. 3A and FIG. 3B show an electrical connection 38 being formed between a portion of the pre-cut aluminum strip conductor 12 and a portion of the aluminum feed strip 34. Connection between the aluminum return strip 36 and the pre-cut aluminum strip conductor 12 is achieved in an analogous manner, and for this reason the formation of connections 38 to the return strip 36 are not shown separately in drawing figures.

The electrical connection 38 is provided by positioning the feed strip 34 perpendicular to the pre-cut aluminum strip conductor 12 and underlapping an end 35 of the first conductive member 66 of the feed strip 34 under the pre-cut aluminum strip conductor 12 and pressing tight. Next an end 35' of the second conductive member 68 of the feed strip 34 is underlapped under the pre-cut aluminum strip conductor 12 and pressed tight. Then an end 23 of the first conductor member 22 of the pre-cut aluminum strip conductor 12 is underlapped under the feed strip 34 and pressed tight. Finally an end 25 of the second conductor member 24 of the pre-cut aluminum strip conductor 12 is underlapped under the feed strip 34 and pressed tight.

In an analogous manner, the electrical connection 38 is provided between the return strip 36 and the pre-cut aluminum strip conductor 12 as follows. The return strip 36 is positioned perpendicular to the pre-cut aluminum strip conductor 12. An end 35 of the first conductive member 70 of the return strip 36 is underlapped under the pre-cut aluminum strip conductor 12 and pressed tight. Next an end 35' of the second conductive member 70 of the return strip 36 is underlapped under the pre-cut aluminum strip conductor 12 and pressed tight. Then an end 23 of the first conductor member 22 of the pre-cut aluminum strip conductor 12 is underlapped under the return strip 36 and pressed tight. Finally an end 25 of the second conductor member 24 of the pre-cut aluminum strip conductor 12 is underlapped under the return strip 36 and pressed tight.

When connecting the feed strip and the return strip to the pre-cut aluminum strip conductor an adhesive (not shown) may be applied to the electrical connection 38 for additional reinforcement to secure the electrical connection 38 in place on the wall surface or ceiling surface.

Figure 4:
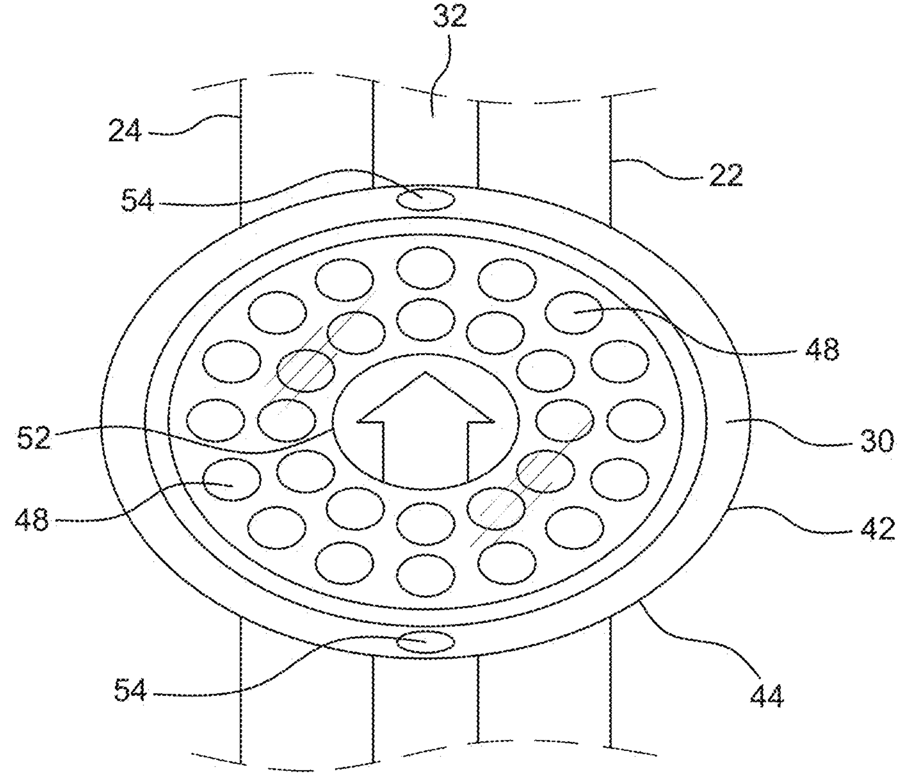
FIG. 4 is an enlarged front view of a light mounted on a portion of the pre-cut aluminum strip circuit for a surface mounted lighting system.
Figure 5:
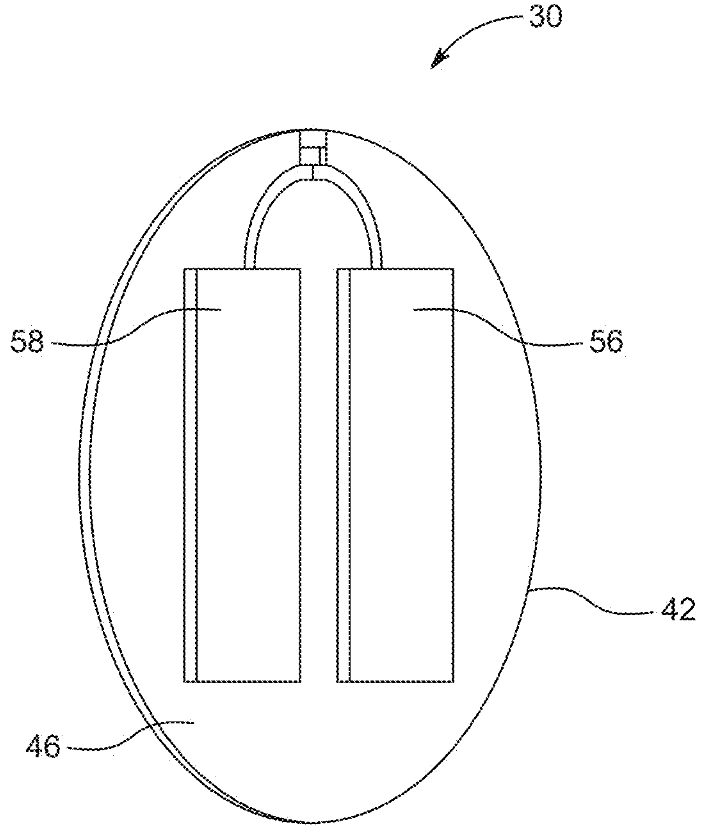
FIG. 5. is an enlarged back view of a light for mounting on a portion of the pre-cut aluminum strip circuit for a surface mounted lighting system FIG. 6. is a schematic representation of a side view of a light mounted on a portion of the pre-cut aluminum strip circuit for a surface mounted lighting system, showing detail of its layered structure.
Figure 6:
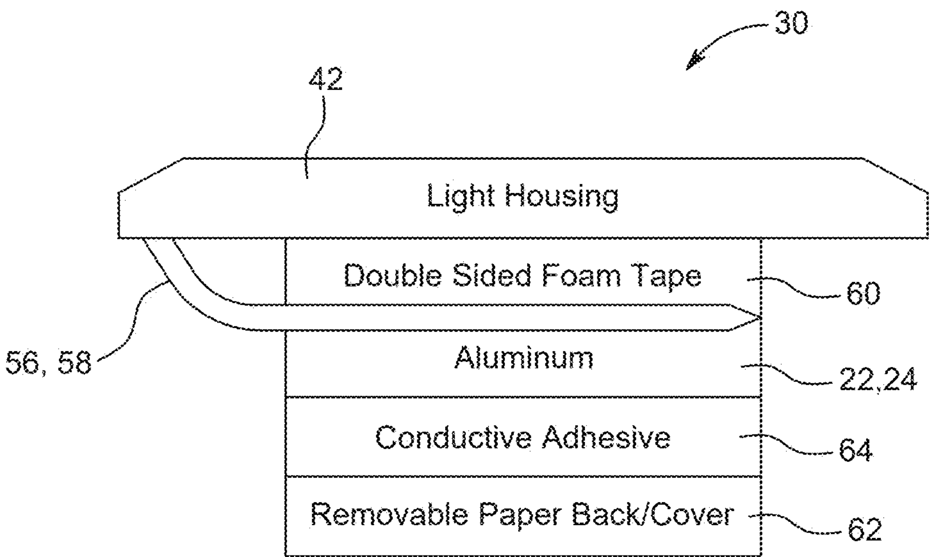

The one or more LED lights 30 are conventional components whose structure and function are known to those skilled in the art. As shown in FIGS. 4, 5 and 6, each LED light 30 may include a housing member 42 having an outer perimeter 44 (having an outer surface) and a back surface 46, one or more and bulbs 48 and conventional electrical/light circuitry disposed (not shown) within the housing. A clear, transparent or translucent cover can be provided over bulb(s) and preferably is secured the outer perimeter of the housing member. An electric flow marking 52 can also be secured to LED light 30 and is shown as preferably a removable arrow sticker 52 pointing in a specific direction/position that LED light 30 should be secured to the first conductor member 22 and the second conductor member 24 to ensure proper electrical flow. Alignment markings 54 are used to properly position the LED light 30 on the first conductor member 22 and the second conductor member 24. When the alignment markings 54 are positioned to line up with the gap 32 between on the first conductor member 22 and the second conductor member 24, the contact members 56, 58 on back surface of light 30 will be properly aligned to make a electrical connection on the first conductor member 22 and the second conductor member 24 when light 30 is adhered thereto. Once light 30 is secured, the alignment markings 54 and the flow marking 52 can be removed. Similar removable alignment markings and flow marking can also be provided on controller 40 to facilitate aligning and securing to the aluminum feed strip 34 and the aluminum return strip 36 to the controller 40. Optionally, a handheld wireless controller interface 41 may be used with the controller. For convenience, the wireless controller interface 41 can be stored in a wall mounted holder.

FIG. 5 illustrates the back of the LED light 30. Contact members 56, 58 are provided on back surface 46 of the LED light 30. Depending on the proper orientation of LED light 30 in a particular designed lighting system, contact member 56 either makes electrical contact and connection with the first conductor member 22 or the second conductor member 24, and contact member 58 makes electrical contact with the other conductor member.

As shown in FIG. 6, each contact member 56 and 58 are preferably multi-layered and constructed similar to each other, such that the description for the layers of contact member 56, also apply for contact member 58. Additionally, the back surface of controller 40 also contains a pair of similar contact members for electrically connecting controller 40 to the first conductor member 22 or the second conductor member 24 in the same manner. The permanent layers making up the contact member 56, 58 can comprise foam tape 60 (preferably double sided, though not limiting), a conductive member and conductive adhesive 64. Prior to attaching light 30 or controller 40, a removable cover 62 (preferably in the non-limiting form of a removable paper cover) can be provided over conductive adhesive 64, such that the conductive adhesive is protected and not exposed prior to use. When light 30 (or controller 40) is to be attached to a surface, paper cover 62 is removed to expose conductive adhesive 64 and allow such adhesive to secure light 30 or controller 40 to the surface.

The foam strips 60 of contact members 56 and 58 can be attached to back surface 46 by conventional means (i.e. adhesive, glues, tapes, etc.) and can be preferably positioned side by side to each other. Contact members 56 and 58 provide for a “positive” and “negative” electrical connection for light 30. Preferably, the space between contact members 56 and 58 is the same or similar to gap 32 between the first conductor member 22 and the second conductor member 24. Wires preferably deliver electrical energy for running the preferred LED light 30 and communicate with a positive and negative electrical connection on the circuit board within light 30 or controller 40.

As mentioned above, a cover tape 62 is pulled off from both contact members 56,58 or otherwise removed when installing light 30, and light 30 can then be stuck to or onto the first conductor member 22 and the second conductor member 24.

As referenced above, the preferred LED lights 30 can be controlled through controller 40 which is also electrically connected to the first conductor member 22 and the second conductor member 24 in a similar manner. Once completed, a preferred 120V to 12V AC to DC adaptor can be conventionally plugged into an electrical outlet 18 and through an electrical power cord 20 running from an adaptor connected with controller 40 to provide for an electrical connection. By using an adaptor the surface mounted lighting system 10 is maintained as a low voltage electrical device/lighting system. The power supply enables a maximum current of 3 amps. Thus the surface mounted lighting system with the pre-cut aluminum strip conductor 12 having a prefabricated circuit shape with a feed strip, a return strip and adapter will feed a maximum of 10 LED lights. Exceeding the 3-amp load could result in overheating.

A method of installing a surface mounted lighting system comprises the following steps. A pre-cut aluminum strip conductor 12 is provided comprising a first conductor member 22, and a second conductor member 24 in spaced apart relation to the first conductor member 22. Each of the first conductor member 22 and the second conductor member 24 comprise an aluminum strip 27, 28 of a selected size and shape to make electrical contact with a respective one of a first electrical contact 56 and a second electrical contact 58 of the at least one LED light 30. An adhesive layer 29 fixed to a first 31 side of each of the first conductor member 22 and the second conductor member 24 for attachment to the wall or ceiling surface. A removable backing layer 33 is in protective contact with the adhesive layer prior 29 to attachment to the wall or ceiling surface. The removable backing layer 33 is removed from the first side 31 exposing the adhesive layer 29. Then each of the first conductor member 22 and the second conductor member 24 are pressed to the wall or ceiling surface to the wall surface or ceiling surface to attach the pre-cut aluminum strip conductor 12.

The first electrical contact 56 of the LED light 30 is aligned with the first conductor member 22 and the second electrical contact 58 is aligned with the second conductor member 24 of the pre-cut aluminum strip conductor in electrical communication and are pressed to adhere the LED light 30 to the pre-cut aluminum strip conductor 12.

The next step is attaching an aluminum feed strip 34 for electrical connection 38 to the pre-cut aluminum strip conductor 12. This is accomplished by underlapping an end 35 of the aluminum feed strip 34 to an end 23 of one of the first conductor member 22 or second conductor member 24 and pressing tight, then underlapping the end 23 of the first conductor member 22 or second conductor member 24 under the aluminum feed strip 34 and pressing tight to form the electrical connection 38. In total it takes four underlaps to complete a connection 38 which provides secure contact because there are underlaps from the top and bottom all of which are pressed to secure. A non-conductive adhesive (not shown) is applied to hold the connection 38 in position on the ceiling (or wall surface) on which the lighting system is installed.

The aluminum feed strip 34 is then connected to a controller 40 having electronics or electrical circuitry for controlling operation of the at least one LED light 30 and for providing power for energizing the at least one LED light adhered to the pre-cut aluminum strip conductor. This is accomplished by aligning a first electrical contact 56 of the controller 40 with the first conductor member 22 and the second electrical contact 58 is aligned with the second conductor member 24 of the controller 40 in electrical communication and are pressed to adhere it to the pre-cut aluminum strip conductor.

Then an aluminum return strip 36 is attached for electrical connection between the pre-cut aluminum strip conductor 12 and the controller 40 for electrical connection between the pre-cut aluminum strip conductor 12 and the controller 40 to complete an electrical circuit. This is accomplished by underlapping an end 37 of the aluminum return strip 36 to the end 23 of the first conductor member 22 and pressing tight, then underlapping the end 25 of the second conductor member 24 under the aluminum return strip 36 and pressing tight to form the electrical connection 38. An adhesive is added to the electrical connection 38 once the underlays are complete. Finally, the controller 40 is connected to an electrical supply.

The surface mounted lighting system according to the present invention can be packaged as a kit for easy installation. The kit comprises an aluminum strip conductor 12 which comes as a first conductor member 22 and a separate second conductor member 24. A reel of aluminum strip tape is provided from which to form the aluminum feed strip 34 and the aluminum return strip 36. The reel would provide two aluminum strips (27, 28) side by side with correct spacing therebetween. A first side 31 of each of the two aluminum strips 27, 28 is in contact with an adhesive layer 29 for attachment to the ceiling/wall surface. A protective paper layer 23 would protect the adhesive prior to installation, following which the protective layer would be peeled off. The user would cut a desired length of aluminum strip tape sufficient to connect the aluminum strip conductor 12 to the controller 40. Connections 38 would be formed by the underlapping method discussed above. An adhesive may also be provided in the kit to secure the connections 38 to the ceiling or wall surface. A plurality of LED lights would be provided in the kit. A spacer to is also included to assist with the spacing between the feeder and return strip.

The present invention provides an environmentally sustainable lighting system. The surface mounted aluminum strip conductor, aluminum feed strip and aluminum return strip are mounted directly onto the surface of the ceiling or wall where the user wishes to install lighting. There is no need to cut drywall to access electrical conduits within a wall. This eliminates dust in the installation area, and there are no portions of drywall to be removed. The only waste generated would be the packaging in which the lighting system is sold and shipped.

I claim:

1. A surface mounted lighting system comprising:

a pre-cut aluminum strip conductor having integrally formed linear stretches and corners defining a substantially rectangular shape;

said pre-cut aluminum strip conductor comprising a first conductor member, and a second conductor member in spaced apart relation to the first conductor member, said pre-cut aluminum strip conductor being adapted for direct attachment to a wall surface or a ceiling surface to define a circuit path;

at least one LED light having a first electrical contact and a second electrical contact adhered to and in electrical communication with the pre-cut aluminum strip conductor at a selected surface location on a wall surface or a ceiling surface;

a controller having electronics or electrical circuitry for controlling operation of the at least one LED light and for providing power for energizing the at least one LED light adhered to the pre-cut aluminum strip conductor;

an aluminum feed strip comprising a first conductive aluminum member underlapping the first conductor member of the pre-cut aluminum strip conductor, and a second conductive member underlapping the second conductive member of the pre-cut aluminum strip conductor for electrical connection between the pre-cut aluminum strip conductor and the controller; and an aluminum return strip comprising a first conductive aluminum member underlapping the first conductor member of the pre-cut aluminum strip conductor and a second conductive aluminum member underlapping the second conductor member of the pre-cut aluminum strip conductor for electrical connection between the pre-cut aluminum strip conductor and the controller to complete an electrical circuit.

2. The surface mounted lighting system of claim 1, wherein the first conductor member and the second conductor member each comprise an aluminum strip of a selected size and shape to make electrical contact with a respective one of the first electrical contact and the second electrical contact of the at least one LED light; and wherein an adhesive layer is fixed to a first side of each of the first conductor member and the second conductor member for attachment to the wall or ceiling surface.

3. The surface mounted lighting system according to claim 1, further comprising:

a removable backing layer in protective contact with the adhesive layer of the first conductor member and the second conductor member prior to attachment to the wall or ceiling surface.

4. The surface mounted lighting system of claim 2, further comprising a removable guide layer adhered to a second side of each of the first conductor member and the second conductor member to maintain the first conductor member and the second conductor in spaced apart relation during installation of the surface mounted lighting system.

5. A method of installing a surface mounted lighting system comprising the steps of:

providing a pre-cut aluminum strip conductor having integrally formed linear stretches and corners defining a substantially rectangular shape comprising a first conductor member, and a second conductor member in spaced apart relation to the first conductor member, each of the first conductor member and the second conductor member comprising an aluminum strip of a selected size and shape to make electrical contact with a respective one of a first electrical contact and a second electrical contact of at least one LED light, an adhesive layer fixed to a first side of each of the first conductor member and the second conductor member for attachment to a wall surface or a ceiling surface, and a removable backing layer in protective contact with the adhesive layer prior to attachment to the wall surface or ceiling surface;

removing the removable backing layer and attaching the adhesive layer of the first conductor member and the second conductor member to the wall surface or the ceiling surface;

adhering the first electrical contact of the LED light with the first conductor member and the second conductor member with the second electrical contact of the LED light in electrical communication;

attaching an aluminum feed strip comprising a first conductive aluminum member and a second conductive member for electrical connection between the pre-cut aluminum strip conductor and a controller having electronics or electrical circuitry for controlling operation of the at least one LED light and for providing power for energizing the at least one LED light adhered to the pre-cut aluminum strip conductor;

attaching an aluminum return strip comprising a first conductive aluminum member and a second conductive aluminum member for electrical connection between the pre-cut aluminum strip conductor and the controller to complete an electrical circuit; and connecting the controller to an electrical supply.

6. The method of claim 5, wherein the step of attaching the aluminum feed strip for electrical connection between the pre-cut aluminum strip conductor and the controller comprises the steps of:

positioning the feed strip perpendicular to the pre-cut aluminum strip conductor;

underlapping an end of the first conductive member of the feed strip under the pre-cut aluminum strip conductor and pressing to form the electrical connection;

underlapping an end of the second conductive member of the feed strip under the pre-cut aluminum strip conductor and pressing to form the electrical connection;

underlapping an end of the first conductor member of the pre-cut aluminum strip conductor under the feed strip and pressing tight; and underlapping an end of the second conductive member of the feed strip under the pre-cut aluminum strip conductor and pressing to form the electrical connection.

7. The method of claim 6, wherein the step of attaching the aluminum return strip for electrical connection between the pre-cut aluminum strip conductor and the controller comprises the steps of:

positioning the return strip perpendicular to the pre-cut aluminum strip conductor;

underlapping an end of the first conductive member of the return strip under the pre-cut aluminum strip conductor and pressing to form the electrical connection;

underlapping an end of the second conductive member of the return strip under the pre-cut aluminum strip conductor and pressing to form the electrical connection;

underlapping an end of the first conductor member of the pre-cut aluminum strip conductor under the return strip and pressing to form the electrical connection; and underlapping an end of the second conductive member of the return strip under the pre-cut aluminum strip conductor and pressing to form the electrical connection.

* * * * *